United States Patent [19]

Townsend et al.

[11] 4,297,561
[45] Oct. 27, 1981

[54] SEMI-AUTOMATIC WELDING GUN

[75] Inventors: Raymond L. Townsend; Jack R. Kester; Kenneth A. Young, all of Wichita, Kans.

[73] Assignee: Tweco Products, Inc., Wichita, Kans.

[21] Appl. No.: 32,350

[22] Filed: Apr. 23, 1979

[51] Int. Cl.³ ............................................... B23K 9/32
[52] U.S. Cl. ........................... 219/137.63; 219/137.42
[58] Field of Search ................... 219/137.63, 137.42, 219/137.31; 200/157

[56] References Cited

U.S. PATENT DOCUMENTS

| | | | |
|---|---|---|---|
| Re. 22,310 | 5/1943 | Nelson | 219/98 |
| 3,324,228 | 6/1967 | Larsson | 174/89 X |
| 3,629,547 | 12/1971 | Kester | 219/137.63 X |
| 3,671,699 | 6/1972 | Matthews | 200/157 |
| 3,775,584 | 11/1973 | Moerke | 219/137.63 |
| 3,783,233 | 1/1974 | Molin | 219/137.63 X |
| 4,049,443 | 9/1977 | Pratt | 219/137.63 X |

Primary Examiner—E. A. Goldberg
Attorney, Agent, or Firm—John H. Widdowson

[57] ABSTRACT

A welding gun apparatus to supply welding wire, electrical power, shielding gas, and electrical control to a working area having a supply adapter assembly, a quick connector assembly, a cable assembly, and a welding gun assembly. A handle assembly is provided enclosing a cable connector assembly having a connector threaded on each end portion, and an actuator switch assembly.

5 Claims, 4 Drawing Figures

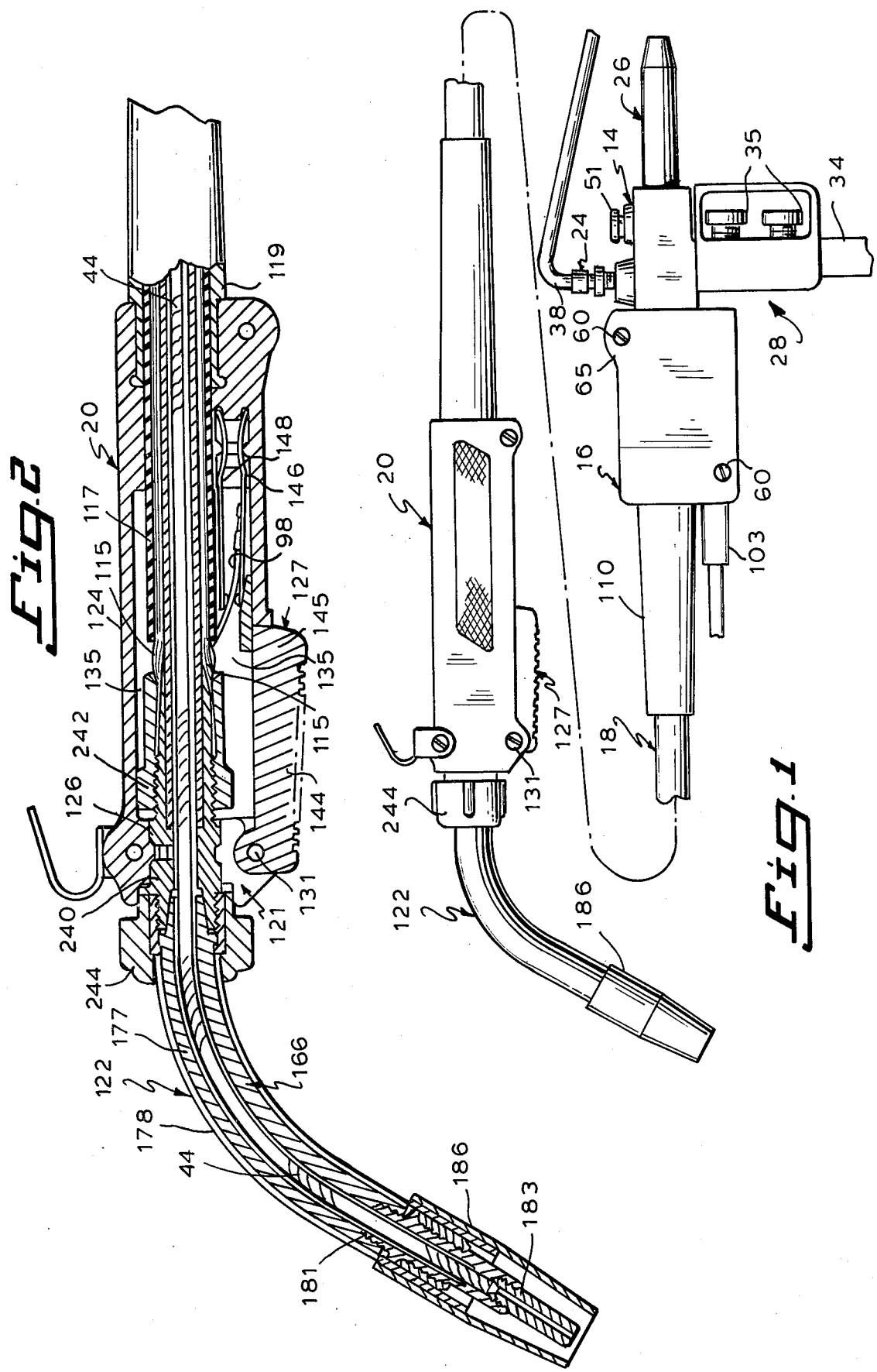

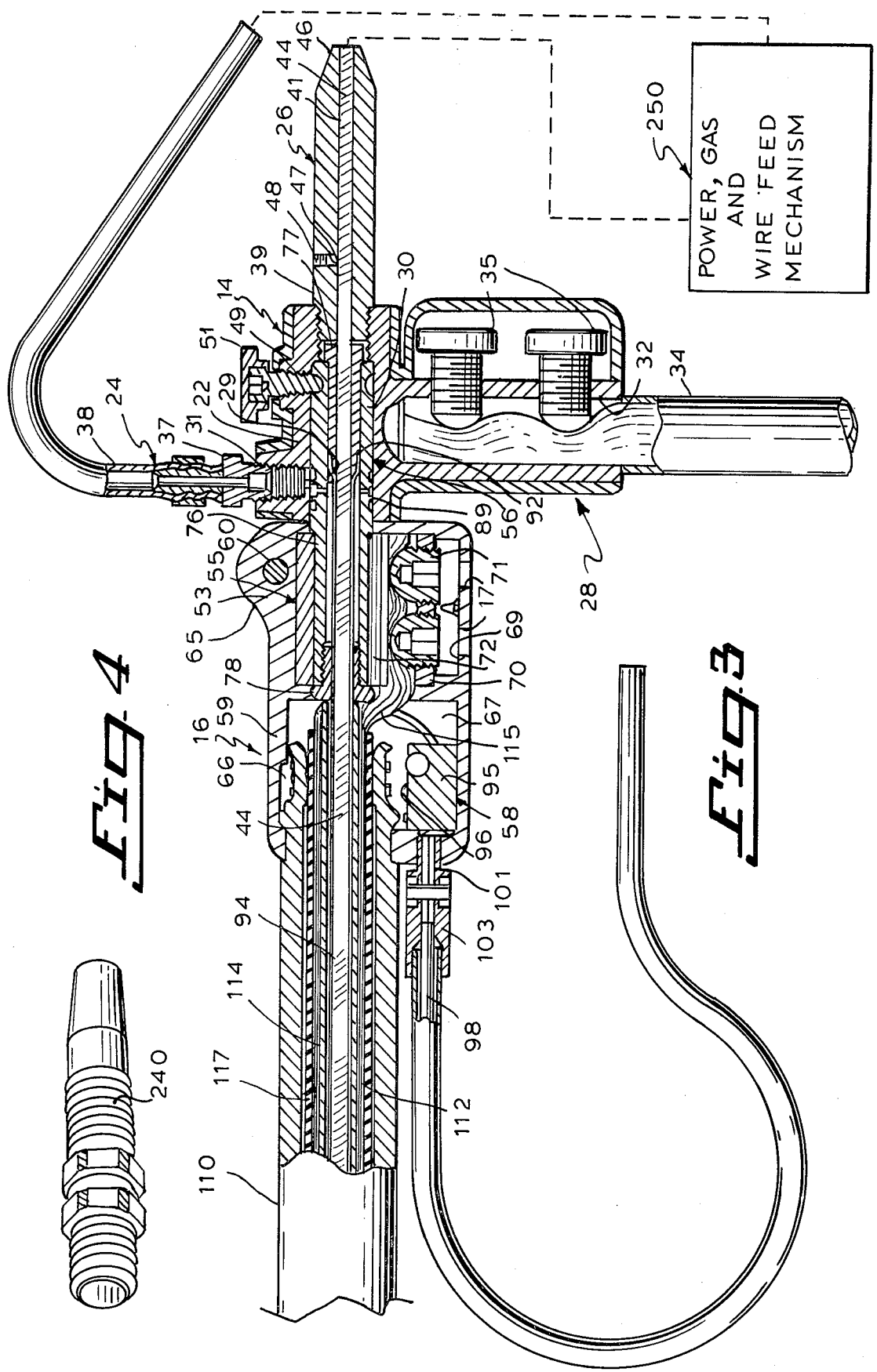

SEMI-AUTOMATIC WELDING GUN

BACKGROUND OF THE INVENTION

1. Field of the Invention—

The invention is related to a welding gun. More specifically, this invention provides a welding gun apparatus to controllably supply welding wire, electrical power, and shielding gas to a working area.

2. Description of the Prior Art—

In our U.S. Pat. No. 3,629,547, Dec. 21, 1971, we invented a semi-automatic welding apparatus. Since the patenting of this invention, we have improved this invention. More specifically, we discovered an improved handle assembly in combination with a removably, adjustable tube assembly for our semi-automatic welding apparatus. Our U.S. Pat. No. 3,629,547, Dec. 21, 1971, will be entirely incorporated herein by reference, and parts not shown in the drawings herein are illustrated in detail in our U.S. Pat. No. 3,629,547.

SUMMARY OF THE INVENTION

It is therefore an object of this invention to provide an improved semi-automatic welding apparatus.

It is another object of this invention to provide an improved semi-automatic welding apparatus having an adjustable, removable tube assembly and an improved handle assembly.

Broadly, this invention is a welding gun apparatus to supply welding wire electrical power and shielding gas to a working area comprising a supply adapter assembly connected to a welding wire and gas feed unit; a quick connector assembly releasably connected to the supply adapter assembly to receive the shielding gas, welding wire, electrical power, and a control circuit therefrom; a cable assembly, and a welding gun assembly having an improved handle assembly with a removable adjustable tube assembly with respect to the gun assembly.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a side view of the gun assembly and the supply adapter assembly, and quick connector assembly;

FIG. 2 is a partial sectional view of the improved semi-automatic welding gun apparatus of this invention;

FIG. 3 is a partial sectional view of the supply adapter assembly and quick connector assembly of this invention; and FIG. 4 is an enlarged perspective view of the cable connector.

DETAILED DESCRIPTION OF THE INVENTION

Referring in detail now to the drawings, wherein similar parts of the invention are identified by like reference numerals, an improved semi-automatic welding gun apparatus of this invention is readily connectable to a welding wire and gas feed mechanism, generally illustrated as 250, which is operable on activation of a control circuit to supply welding wire, electrical power, and shielding gas. The welding gun apparatus includes first a supply adapter assembly 14 easily connectable to the welding wire and gas feed mechanism 250; a quick connector assembly 16 readily connectable to the supply adapter assembly 14; a cable assembly 18 having one end connected to the quick connector assembly 16; and a welding gun assembly 20 connected to the outer end of the cable assembly 18.

The supply adapter assembly 14 includes a main support housing 22; gas feed adapter 24 connected to the support housing 22; a wire feed adapter 26 threadably connected to the support housing 22; and a power cable adapter 28 integral with the support housing 22. The support housing 22 includes a central elongated bore 30 having a gas entrance bore 31 extended laterally from one side thereof and one end of the central bore 30 is provided with internal threads to receive the wire feed adapter 26 therein. The power cable adapter 28 is a laterally extended portion of the support housing 22 and provided with a circular entrance 32 to receive an electrical conductor cable 34 secured against the housing by a pair of ballpoint setscrew members 35 to achieve electrical continuity.

The gas feed adapter 24 is provided with a main connector plug 37 mounted in the gas entrance bore 31 and secured to a hose member 38 to supply the shielding gas to the central bore 29 of quick connector assembly 56. The wire feed adapter 26 is provided with a feed plug member 39 having a central hole 41 to receive a welding wire (not shown) within a portion of welding wire conduit 44 as will be explained. The outer end of the feed plug member 39 is provided with a tapered section 46 so as to be mounted within the welding wire and gas feed mechanism. Additionally, the feed plug member 39 is provided with a threaded opening 47 to receive setscrew 48 so as to clamp the wire conduit 44 therewithin.

The support housing 22 is provided with a transversely extended hole 49 intersecting the central bore 30 adapted to receive a lock screw 51 therethrough so as to securely clamp the quick connector plug assembly 56 within the central bore 30 in a manner to be described.

The quick connector assembly 16 is provided with a main connector housing 53; a cable connector block assembly 55; a quick connector plug assembly 56; and a control wire connector assembly 58. The connector housing 53 is formed of a pair of cooperating substantially identical block housing members 59 placed in the clamped relationship as by cooperating bolt members 60. The outer contour of the connector housing 53 is of an irregular shape adapted to be grasped by one's hand and having an upper arcuate portion 65 to receive one's thumb thereagainst for inserting into the supply adapter assembly 14. It is to be noted that the interior of the connector housing 53 is formed with irregular cavities; a control wire connector assembly cavity 67; and a cable connector block cavity 69.

The cable connector block assembly 55 includes a first cable connector block 70 having a separator member 72 therewithin and a lower portion adapted to threadably receive a pair of ballpoint setscrews 71 illustrated in our U.S. Pat. No. 3,629,547 which, as was previously mentioned, has been entirely incorporated by reference which have hexagonal socket heads to secure a conductor portion of the cable assembly 18 thereto as will be described. The hexagonal socket head screws have been found very desirable and provide for retightening the connector block assembly with a hexagon wrench passing through holes 17 in connector housing 53, as is also true in connection with the gun end assembly of the welding apparatus as will be seen from the description and discussion hereinafter. The connector block 70 is of a generally rectangular shape having an elongated slot (not shown in the drawings) therethrough. The separator member 72 is provided with upper and lower curved surfaces and of a width to fit transversely within the elongated slot. The cable connector block 70 and the separator member 72 are constructed of a conductive material such as copper so as to provide electrical continuity outwardly to the welding gun assembly 20.

The quick connector plug assembly 56 includes an elongated connector plug 76 having a welding wire conduit connector member 77 mounted therein and retained by a setscrew (not shown in the drawings) and is mountable in the central bore 30 of the support housing 22. The connector plug 76 includes a gas hose adapter 78 threadably received at one end and having an elongated central opening. The connector plug 76 is provided with a groove about the outer end so as to receive the lock screw 51 when in the attached condition. Additionally, the outer surface of the connector plug 76 is provided with a stepped shoulder to engage the connector block 70 and rearwardly therefrom, is provided with two O-ring grooves about a central groove. A plurality of openings in the central groove conveys the shielding gas from the gas feed adapter 24 to the elongated central opening. It is to be noted that O-ring members 89 are mounted within the grooves to provide a gas seal within the central bore 30.

The welding wire conduit connector member 77 is provided with a generally cylindrical head section mounted about the outermost end of the flexible welding wire conduit 44 and having mounted thereabout a heavy neoprene gas seal cave 92 to prevent gas leakage from the elongated central opening into the supply adapter assembly 14. The welding wire conduit 44 is formed of a spiral wire or other material up to the welding gun assembly 20 and surrounded by a covering 94 to seal from the shielding gas which moves thereabout into the welding gun assembly 20. The control wire connector assembly 58 is provided with a tab block member 95 mountable within the control wire connector assembly cavity 67 and having a pair of terminal screws 96 to receive control wires thereon. The tab block member 95 is provided with laterally extended male connectors 101 to receive a connector plug 103 thereupon to provide the control circuit through the control wires 98 to an adapter plug (not shown in the drawings).

The cable cavity 66 is of a generally circular shape having a cylindrical groove portion so as to receive a portion of a hose clamp about the innermost end of the cable assembly 18 to secure the same within the connector housing 53 against lateral movement.

The cable assembly 18 is provided at the connection to the quick connector assembly 16 with an outer heavy shield member 110 so as to limit the flexibility at this point to prevent a rupture of the elements contained therein. The cable assembly 18 includes the welding wire conduit 44 having spaced therefrom a cable insulator and gas hose 112 to form a cavity 114 to convey the shielding gas therethrough. Next, an electrical conductor cable 115 is mounted against the outer surface of the cable insulator and gas hose 112 and provided with the insulated control wires and the outer surface is formed with a heavy insulative cover 117. It is noted that the cable assembly 18 provides separate and coaxial channels for the various functions of providing welding wire, shielding gas, an electrical conductor, and separate control wires to achieve the semi-automatic operation of this invention as will be explained. The outermost end of the cable assembly 18 is mountable within a heavy cable grommet 119 in the one end of the welding gun assembly 20 so as to provide means to limit bending of the cable assembly 18 to prevent its rupture.

The welding gun assembly 20 includes a main handle assembly 121 uniting the cable assembly 18 internally with a forwardly extended conductor and supply tube assembly 122. The handle assembly 121 is provided with an elongated gripper housing 124; a cable connector assembly 126 mounted within the gripper housing 124; and an actuator switch assembly 127 within the gripper housing 124 connected to the control wires 98.

The gripper housing 124 is adapted to fit comfortably into one's hand and forms internal cavity portions 135 to receive the cable assembly 18. The outer end of the cable assembly 18 is first inserted through the cable grommet 119. The control wires 98 are connected to the actuator switch assembly 127, and the electrical conductor 115 is secured to cable connector assembly 126 comprising a cable connector 240 (see FIG. 4) and a cable connector nut 242, to provide for efficient electrical connection, as a result of the male and female conical clamping members connection. Cable connector 240 is threadedly mounted on the supply tube assembly 122 end to allow interchangeability of supply tube assembly 122 with another tube assembly or change the angle of supply tube assembly 122 with respect to the gun 20 without disassembling the gun 20.

The actuator switch assembly 127 includes a main trigger 144 pivotally mounted on one of the bolts 131 having an actuator 145 movable to contact a pair of contact members 146 and 148 to close a circuit through the control wires 98. Contact member 146 is spring biased to normally hold the main body 145 downward. This actuator switch assembly 127 is more efficient and simpler than the switch assembly in our U.S. Pat. No. 3,629,547.

The conductor and supply tube assembly 122 includes a main tube assembly 166 releasably and rotatably mounted to cable connector 240 by female and male conical members and by conductor tube electrically insulated retaining nut 244 to provide mechanical connection, ready positioning of tube assembly 166, reliable electrical connection and seal for the shielding gas, and easy interchangeability of main tube assembly. The tube assembly 166 includes a main arcuate tube member 177 (whose position is easily adjustable by loosening nut 244), a gas diffuser 181 threadably engaging tube member 177, contact tip 183 secured to gas diffuser 181, and an insulated nozzle member 186 mounted about the gas diffuser 181. The arcuate member 177 is provided with an outer heavy insulated cover 178.

In the welding operation of the semi-automatic welding apparatus of this invention, a control circuit is provided through the control wires 98 to the actuator switch assembly 127. On operation of the actuator switch assembly 127, the contacts 146 and 148 are closed to provide a circuit through the control wires 98 to the welding wire and gas feed mechanism (not shown) to concurrently supply the shielding gas, electrical power and welding wire to the welding gun assembly 20. Current is carried from the power supply outwardly through the conductor cable 115 and the nozzle tip member 183 and the item to be welded is connected to the other side of the circuit to achieve arc welding in a conventional manner. The shielding gas is supplied through the cable assembly 18, the central bore of the arcuate tube member 177, about the internal structure of the gas diffuser member 181, about the outer surface of the hexagonal portion of the gas diffuser member 181, and about the contact tip member 183. The gas provides a shield about the welding wire 44 as it emerges from the contact tip member 183 and also provides for cooling of the welding gun assembly 20.

While the invention has been described in conjunction with preferred specific embodiments thereof, it will be understood that this description is intended to illustrate and not limit the scope of the invention which is defined by the following claims.

We claim:

1. A welding gun apparatus to supply welding wire, electrical power and shielding gas to a working area, comprising:
   (a) a supply adapter assembly connected to a welding wire and gas feed unit having shielding gas, welding wire, electrical power and a control circuit;
   (b) a quick connector assembly releasably connected to said supply adapter assembly to receive the shielding gas, welding wire, electrical power, and a control circuit therefrom;
   (c) a cable assembly having one end connected to said quick connector assembly to convey the shielding gas, welding wire, electrical power, and the control circuit within individual chambers;
   (d) a welding gun assembly connected to the outer end of said cable assembly having control means connected to said control circuit selectively operable to semi-automatically feed the welding wire in conjunction with the electrical power and shielding gas to the working area;
   (e) said welding gun assembly including a handle assembly connected to a conductor and supply tube assembly;
   (f) said handle assembly having a gripper housing enclosing a cable connector assembly having a cable connector threaded on each of two end portions, and an actuator switch assembly;
   (g) said quick connector assembly having a cable connector block to receive one end of a power supply conductor of said cable assembly and said conductor and supply tube therein, a separator member, and setscrews operable on said power supply conductor and separator member to clamp said power supply conductor and said conductor and supply tube to said connector block for electrical continuity;
   (h) said connector block having an elongated slot therethrough, and said separator member having upper and lower arcuate surfaces which cooperate with said setscrews and power supply conductor and said conductor and supply tube to firmly clamp said power supply conductor and said conductor supply tube therein for electrical continuity through said conductor and supply tube; and
   (i) said cable connector assembly having a cable connector nut threadably engaging one of said two ends of said cable connector to secure thereto said power supply conductors of said cable assembly, said conductor and supply tube assembly including a removably, adjustable tube assembly connected to a nozzle assembly, said tube assembly having a conductor tube retaining nut engaging the other of said two ends of said cable connector in order to remove the tube assembly or to adjust the same with respect to said gun assembly.

2. The welding gun apparatus of claim 1 wherein:
   (a) said tube assembly having a tube member mounted in said cable connector block so as to conduct current, shielding gas and welding wire conduit therethrough;
   (b) said nozzle assembly including a gas diffuser member secured to the outer end of said tube member, a contact tip secured to said diffuser member to train the welding wire therethrough, an insulated nozzle to direct the shielding gas about the periphery of said contact tip to provide welding arc shielding; and
   (c) said gas diffuser member having an outermost surface with an entrance end provided with a spaced opening about the periphery of said welding wire conduit and radially positioned openings to direct gas flow outwardly and then forwardly about said surface and about a discharge end of said nozzle assembly so as to surround said contact tip end and weld zone during welding operations.

3. The welding gun apparatus of claim 1 wherein said actuator switch assembly having a trigger member, a first and a second contact member spacedly situated with respect to each other, said trigger member contacting said first contact member in order to be able to move same towards said second contact member, a pair of control wires interconnecting said first contact member and said power supply conductor, said trigger member being spring biased by said first contact member to normally hold the trigger member downward in an unclosed posture.

4. In a welding gun apparatus including a supply adapter assembly connected to a welding wire and gas feed mechanism, and electrical power source having a power supply conductor, a connector assembly connected to said supply adapter assembly, a cable assembly connected to one end of said connector assembly, and a welding gun having a control circuit and an actuator switch assembly and connected to the other end of said cable assembly and to a conductor and supply tube assembly having a removably, adjustable tube assembly with respect to said gun assembly, the improvement which comprises:
   (a) tube retaining nut means on said tube assembly;
   (b) a cable connector assembly situated in said gun assembly comprising a cable connector threaded on the exterior of each of two end portions, one of said two end portions receiving a cable connector nut, and the other of said two end portions having said tube retaining nut means threadably engaging the same to remove, adjust said tube assembly with respect to said gun assembly.

5. The welding gun of claim 4 wherein said actuator switch assembly including a trigger member, a first and a second contact member spacedly situated with respect to each other, said trigger member contacting said first contact member in order to be able to move same towards said second member, and a control circuit connected to said welding wire and gas feed mechanism with a pair of control wires connecting said first and second contact members to the welding wire and gas feed mechanism control circuit, said trigger member being spring biased by said first contact member to normally hold the trigger member downward in an unclosed posture.

* * * * *